(12) United States Patent
Stoia et al.

(10) Patent No.: US 8,662,502 B2
(45) Date of Patent: Mar. 4, 2014

(54) FUEL NOZZLE SEAL SPACER AND METHOD OF INSTALLING THE SAME

(75) Inventors: Lucas John Stoia, Greenville, SC (US); Karthik Subramanian, Greenville, SC (US)

(73) Assignee: General Electric Company, Schenectady, NY (US)

( * ) Notice: Subject to any disclaimer, the term of this patent is extended or adjusted under 35 U.S.C. 154(b) by 894 days.

(21) Appl. No.: 12/580,313

(22) Filed: Oct. 16, 2009

(65) Prior Publication Data

US 2011/0089267 A1    Apr. 21, 2011

(51) Int. Cl.
*F23R 3/20* (2006.01)
*F16J 15/32* (2006.01)

(52) U.S. Cl.
USPC ........................................................ 277/572

(58) Field of Classification Search
USPC .......... 277/549, 551, 560, 572, 314, 602, 626
See application file for complete search history.

(56) References Cited

U.S. PATENT DOCUMENTS

| 4,061,439 | A | * | 12/1977 | Pech ................................ 415/18 |
| 7,134,287 | B2 | * | 11/2006 | Belsom et al. .................. 60/800 |
| 7,201,381 | B2 | | 4/2007 | Halling |
| 7,546,735 | B2 | | 6/2009 | Widener |
| 7,546,736 | B2 | | 6/2009 | Amond, III et al. |
| 2006/0191268 | A1 | | 8/2006 | Widener et al. |
| 2007/0130955 | A1 | | 6/2007 | Vandale et al. |

* cited by examiner

*Primary Examiner* — Gilbert Lee
(74) *Attorney, Agent, or Firm* — Sutherland Asbill & Brennan LLP (57) ABSTRACT

The present application provides a method of mounting lip seals within a sleeve assembly of a fuel nozzle. The method may include the steps of sliding a first lip seal along a second diameter tube until the first lip seal contacts a first tube flange of a first diameter tube, sliding a seal spacer along the second diameter tube until the seal spacer contacts the first lip seal, and sliding a second lip seal along the second diameter tube until the second lip seal contacts the seal spacer.

19 Claims, 6 Drawing Sheets

FUEL NOZZLE SEAL SPACER AND METHOD OF INSTALLING THE SAME

TECHNICAL FIELD

The present application relates generally to gas turbine engines and more particularly relates to a spacer to separate lip seals positioned about fuel nozzle tubes and a method of installing the same.

BACKGROUND OF THE INVENTION

Gas turbine combustors generally use a number of fuel nozzles positioned about an end cover. Given the potential for large temperature variations among the various internal passages of the fuel nozzles, particularly during transient operations, differing axial thermal growth of the passages may be a design issue. For example, different passages may have fluids of differing temperatures therein or different passages may be constructed of materials with varying coefficients of thermal expansion. Moreover, these passages generally may take the form of concentric tubing. As such, these concentric tubes should have support and vibration damping.

Known fuel nozzles generally have used bellows or piston rings as seals between the concentric tubes. The use of bellows, however, is somewhat costly and may have durability issues. Likewise, the use of piston rings may provide for considerable leakage therethrough. High leakage variation thus may result, particularly between two passages with a high delta pressure thereacross and may lead to undesirable combustion characteristics.

Lip seals have been found to provide improved sealing performance as compared to known piston rings. The lip seals may be positioned and captured at one end about a flange tube end welded onto the end of a sleeve assembly tube and captured at a second end via a counter bore in the fuel nozzle body. Although this method may be effective, subsequent seals must be of an alternate reduced size so as to allow assembly and capture of the seal in both directions. For fuel nozzles requiring multiple seals, there may not be enough space in the radial direction to utilize this method for all required seals.

There is therefore a desire for an improved method of mounting lip seals onto fuel nozzle tubes and adequately capturing them in place. The use of lip seals instead of piston rings should improve the sealing between various nozzle circuits and subsequently improve overall emissions and performance.

SUMMARY OF THE INVENTION

The present application thus provides a method of mounting lip seals within a sleeve assembly of a fuel nozzle. The method may include the steps of sliding a first lip seal along a second diameter tube until the lip seal contacts a first tube flange of a first diameter tube, sliding a seal spacer along the second diameter tube until the seal spacer contacts the first lip seal, and then sliding a second lip seal along the second diameter tube until the second lip seal contacts the seal spacer.

The present application further provides a sleeve assembly for a fuel nozzle. The fuel nozzle may include a first tube having a first diameter, a second tube having a second diameter, and with the first diameter being larger than the second diameter. A first lip seal may be positioned on the second tube and in contact with the first tube. A seal spacer may be positioned on the second tube and in contact with the first lip seal. A second lip seal may be positioned on the second tube.

The present application further provides a method of mounting lip seals within a sleeve assembly of a fuel nozzle end cap. The method includes the steps of positioning a first lip seal about a first tube flange of a first tube, positioning a second lip seal about a second tube flange of a second tube, positioning the sleeve assembly within a first side of the end cap, positioning a third lip seal about a third tube via a second side of the end cap, and securing the third lip seal into place via a seal collar.

These and other features of the present application should become apparent to one of ordinary skill in the art upon review of the following detailed description when taken in conjunction with the several drawings and the appended claims.

DETAILED DESCRIPTION

Figure 1:
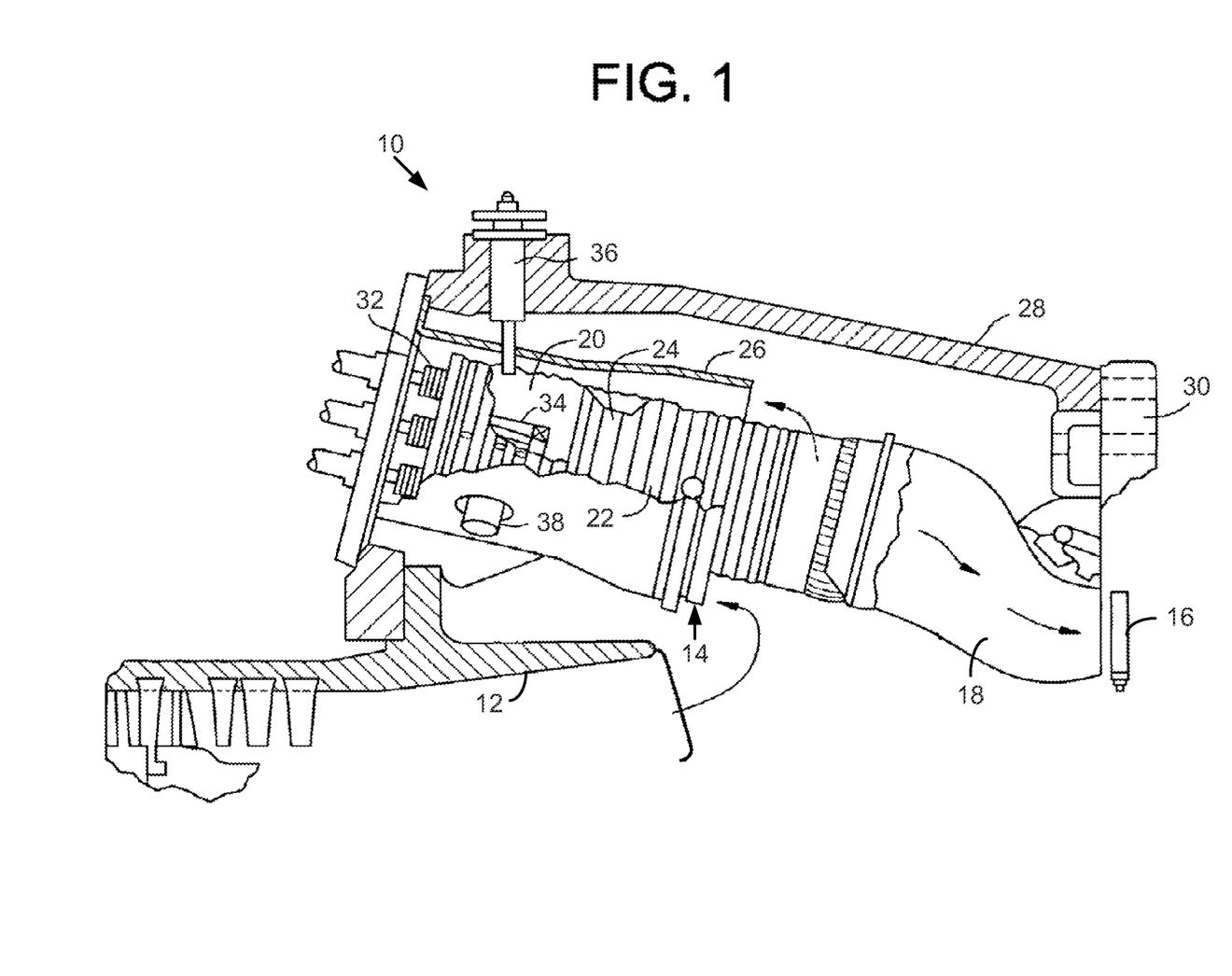
FIG. 1 is a partial cross-sectional view of a gas turbine engine as may be used herein.

Referring now to the drawings, in which like numbers refer to like elements throughout the several views, FIG. 1 shows portions of a gas turbine engine 10 with a compressor 12 (also partially shown), a combustor 14, and a turbine section 16 represented here by a single blade. Although not specifically shown, the turbine 16 is connected to the compressor 12 along a common axis. The compressor 12 compresses an incoming flow of air and delivers the air to the combustor 14. The combustor 14 mixes the compressed flow of air with a compressed flow of fuel and ignites the mixture. Although only a single combustor 14 is shown, the gas turbine engine 10 may include any number of combustors 14. The combustors 14 may be located in an annular array about the axis of the gas turbine engine 10.

The hot combustion gases are in turn delivered to the turbine 16. The hot combustion gases drive the turbine 16 so as to produce mechanical work. The mechanical work produced by the turbine 16 drives the compressor 12 and generally an external load such as an electrical generator and the like. The gas turbine engine 10 may use natural gas, various types of syngas, and other types of fuels. The gas turbine engine 10 is by way of example and may have other configurations and may use other types of components herein.

A transition duct 18 may connect the outlet end of each combustor 14 with the inlet end of the turbine 16 to deliver the hot combustion gases. Each combustor 14 may include a primary or upstream combustion chamber 20 and a secondary or downstream combustion chamber 22 generally separated by a throat region 24. The combustor 14 may be surrounded by a combustor flow sleeve 26 so as to channel the compressor discharge airflow to the combustor 14. The combustor 14 further may be surrounded by an outer casing 28 that may be bolted or otherwise attached to a turbine casing 30. The combustor 14 further may include a number of primary nozzles 32 so as to provide fuel to the primary combustion chamber 20. The primary nozzles 32 may be arranged in an annular array around a central secondary nozzle 34. Ignition may be achieved in the combustor 14 by means of a sparkplug 36 in conjunction with a number of cross fire tubes 38 (one shown). The secondary nozzle 34 may provide fuel to the secondary combustion chamber 22. Other configurations and designs may be used herein.

Figure 2:
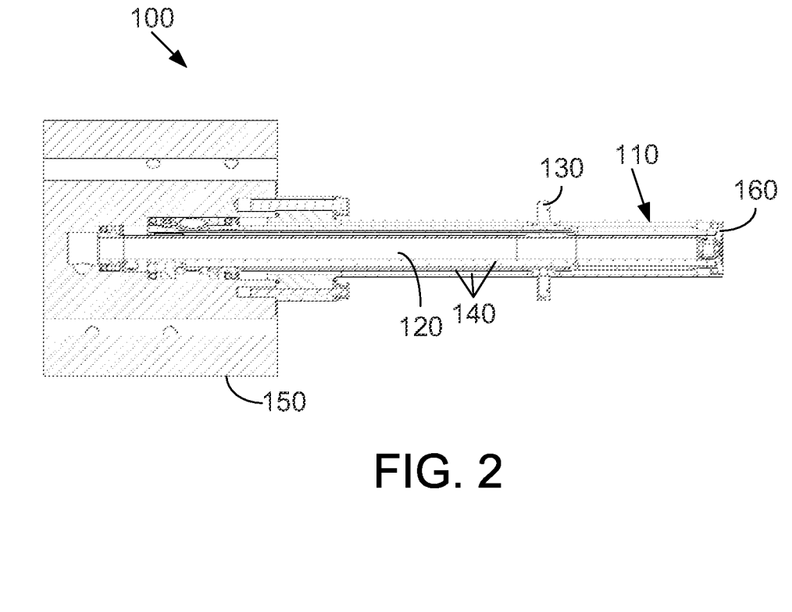
FIG. 2 is a side view of a portion of secondary nozzle as may be used herein.
Figure 3:
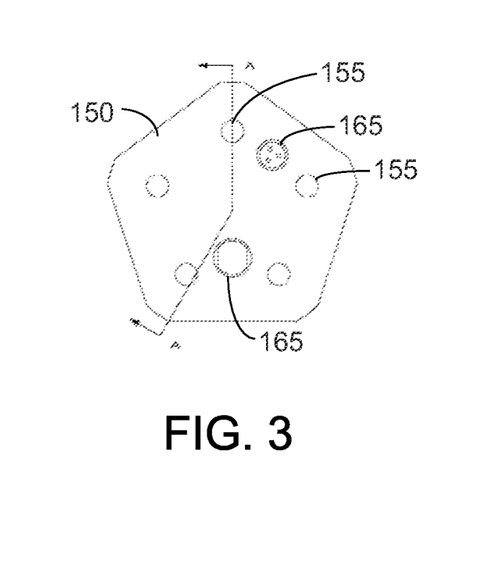
FIG. 3 is a hinged cross-sectional view about the end cap of the secondary nozzle of FIG. 2.

FIGS. 2 and 3 show a secondary nozzle 100 as may be described herein. The secondary nozzle 100 may include a number of concentric tubes 110. The concentric tubes 110 may define any number of passages therethrough. The concentric tubes 110 may include a central passage 120. The central passage 120 may be a liquid fuel passage in communication with a number of nozzle pegs 130. Surrounding the central passage 120 may be any number of secondary passages 140. The secondary passages 140 may include pilot, secondary, and tertiary gas passages, water purge passages, airflow passages, and other types of fluid flows.

The concentric tubes 110 may be mounted at one end to an end cap 150. The end cap 150 may have a number of spacer flow holes 155 and fuel or air conduits 165 therethrough. The concentric tubes 110 may extend to a nozzle tip 160 at the other end. Any number of secondary passages 140 and/or concentric tubes 110 may be used herein. Other configurations and designs may be used herein.

Figure 4:
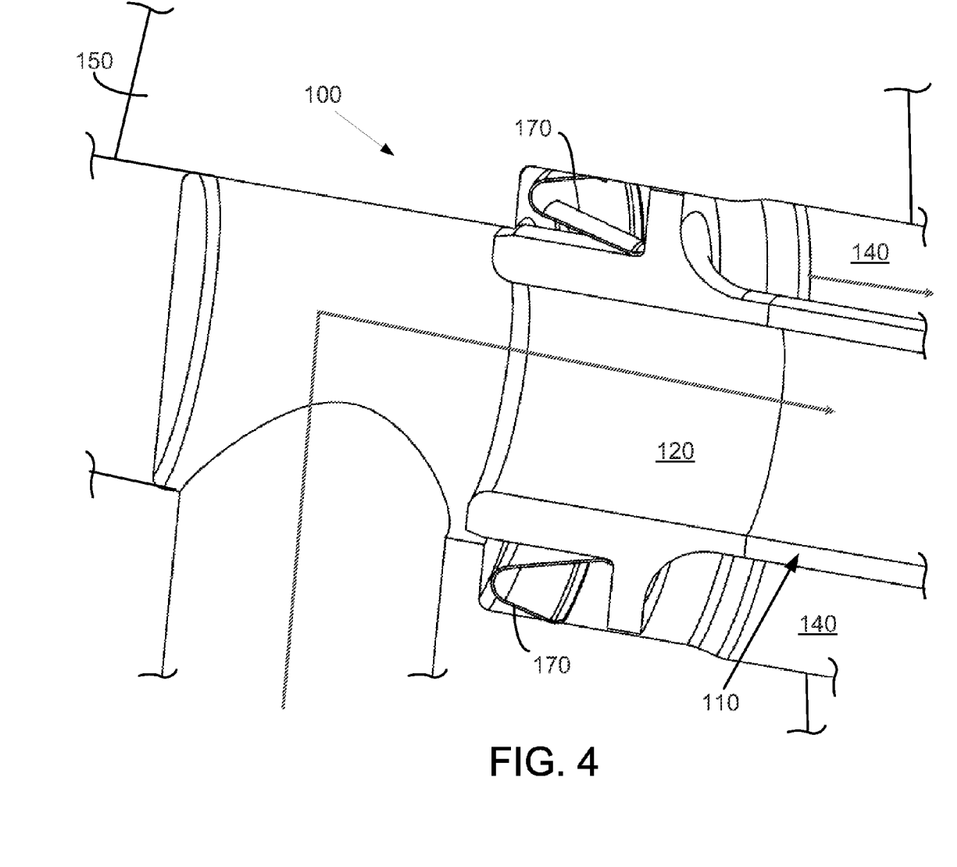
FIG. 4 is a side cross-sectional view of a number of concentric tubes with lip seals as may be described herein.

FIG. 4 shows an example of the concentric tubes 110 of the secondary nozzle 100. As is shown, a number of secondary passages 140 surround the central passage 120. Positioned between any pair of the concentric tubes 110 may be a number of lip seals 170. The lip seal 170 is a form of a radial seal that reduces fuel leakage therethrough. The lip seal 170 also may be positioned between the concentric tubes 110 and the end cap 150.

The lip seals 170 are typically applied to rotating shafts. Generally described, the lip seal 170 seals by seating on a shaft that compresses the inside diameter and seats in a bore that compresses the outside diameter. In a typical rotating shaft application, the inside diameter would be considered the dynamic side of the seal as the shaft will rotate relative to the stationary lip seal. The seal design relies on compression to provide a normal force on the inside and outside sealing surfaces.

Figure 5:
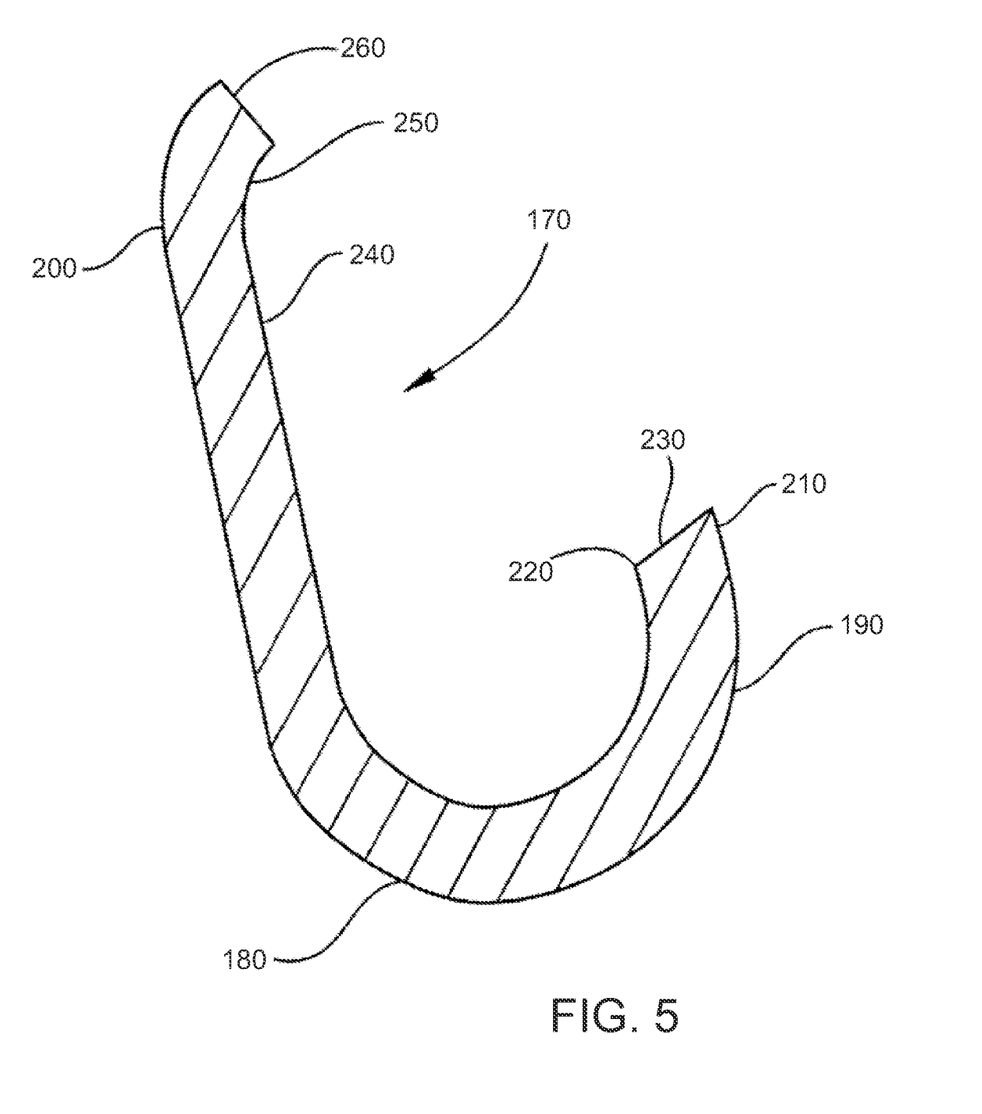
FIG. 5 is a side cross-sectional view of a lip seal as may be used with a sleeve assembly.

FIG. 5 shows a side view of an example of the lip seal 170. The lip seal 170 may include an arcuate portion 180, an outer sealing line 190, and an inner sealing line 200. The lip seal 170 may include an inward curl 210 at one end of the arcuate portion 180 so as to form a return 220 at a first edge 230. The lip seal 170 also may include an inwardly tapering frustroconical portion or longitudinally extended portion 240 that terminates in an outward curved portion 250 to the second opposed edge 260. The function of the return 220 is to provide stiffening and a lead that facilitates the smooth insertion of the seal 170 into an internal cavity. Other configurations and designs may be used herein. The lip seal 170 may be made out of nickel super alloys, nickel cobalt alloys, and similar materials.

In the present application, the lip seals 170 allow for thermal growth in that the lip seals 170 allow for axial sliding along the inside diameter or inner curl 210 while maintaining a seal. The lip seal 170 is basically a metallic radial spring. Because the lip seal 170 is a full circumferential spring seal, the lip seal 170 also increases the natural frequencies of the nozzle components away from excitation sources. The improved sealing also reduces pilot flow variations due to passage to passage leakage in ultra low emission combustors. This is important to control accurately the low fuel flow rate of the pilot. Additionally, the lip seals 170 may allow for higher concentrations of $H_2$ and other types of highly reactive fuels with acceptable leakage for greater fuel flexibility. Known piston ring leakage generally places much lower limits on acceptable concentrations of highly reactive fuels.

Figure 6:
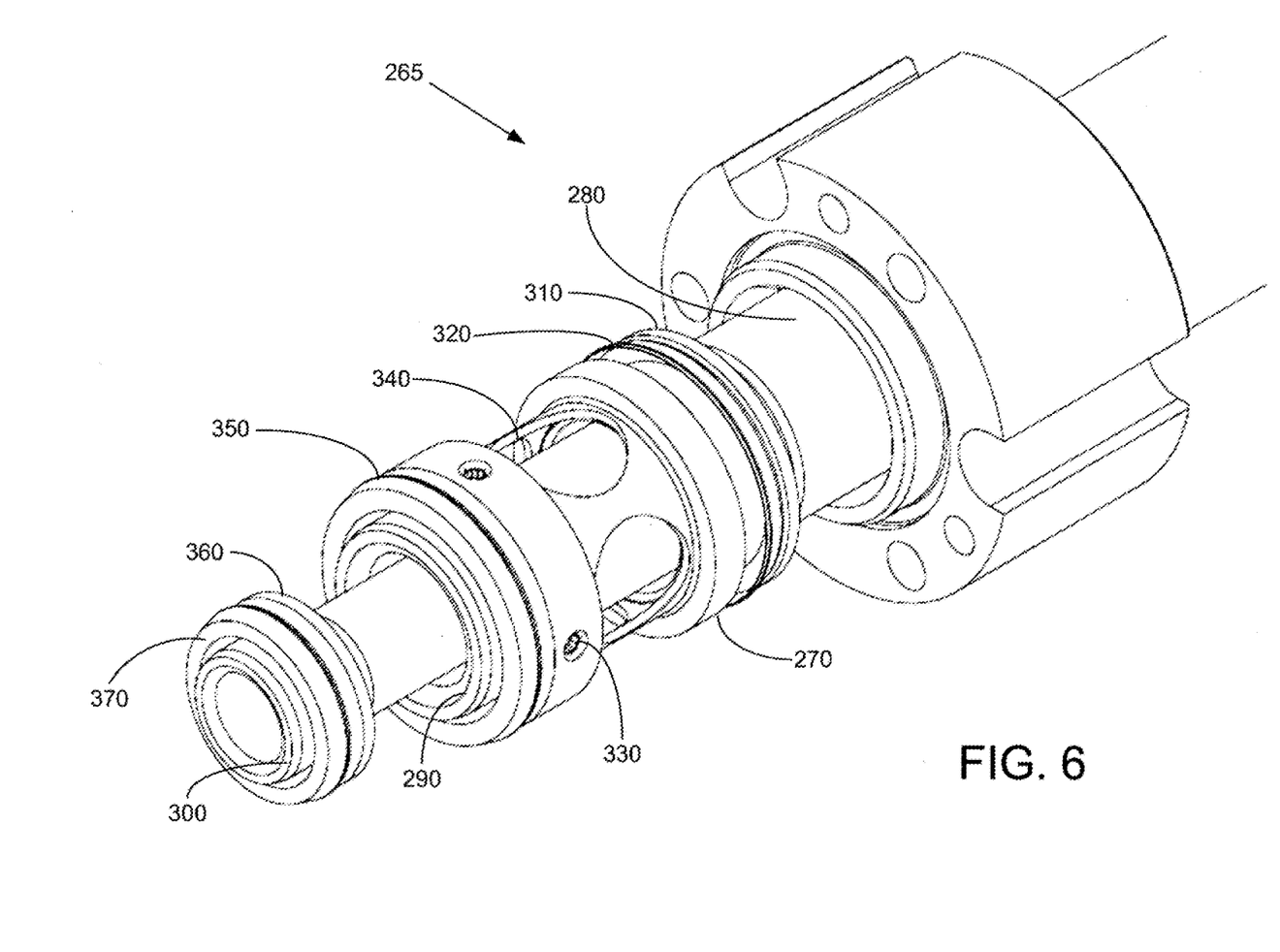
FIG. 6 is a perspective view of a seal spacer and a number of lip seals mounted onto the tubes of a sleeve assembly as may be described herein.

FIG. 6 shows an example of a sleeve assembly 265 for use with the fuel nozzle 100. The sleeve assembly 265 has a seal spacer 270 as may be described herein. In this example, three secondary passages 140 of progressively smaller diameter are shown, a first tube 280, a second tube 290, and a third tube 300. The tubes 280, 290, 300 may have any desired decreasing diameter. Any number of tubes 280, 290, 300 may be used herein.

The first tube 280 may include a flange end 310. One of the lip seals 170, a first lip seal 320, may be slid over the second tube 290 with compression/decompression of the inner diameter 210 and may be recompressed on the first tube 280 and fastened to the second tube 290 about the flange end 310. The seal spacer 270 then may be slid along the second tube 290 and into contact with the first seal 320. The second tube 290 lacks a flanged end. The seal spacer 270 may include a set screw 330 or other type of connection means to hold the spacer 270 in place. The second tube 290 may have spot faces machined thereon so as to allow the set screw 330 to disrupt the spot face surface without leaving burrs to catch the seals 170 during assembly or disassembly. Any number of set screws 330 may be used. The seal spacer 270 also includes a number of flow apertures 340 so as to allow fluid flow therethrough with a negligible pressure drop. Any number, size, or shape of the flow apertures 340 may be used. The seal spacer 270 may be made out of stainless steel, or similar types of materials.

A second flow seal 350 then can be slid until the inner diameter 210 is compressed and the seal is positioned in place on the second tube 290 adjacent to the spacer 270. The compression maintains the second flow seal 350 in place. The third tube 300 also may have a flanged end 360. A third lip seal 370 may be slid over the third tube 300 until the inner diameter 210 is compressed and the seal 370 is positioned against the flanged end 360. The compression also maintains the third lip seal 370 in place. The tubes 280, 290, 300 and the sleeve assembly 265 as a whole then may be placed in the fuel nozzle 100.

The use of the seal spacer 270 and the method of installing the same thus allow the use of multiple lip seals of the same size for better sealing between the tubes 280, 290, 300. Among the benefits of this improved sealing may be less pilot variation. By reducing such variation, the nozzle pilot fuel flow may be turned down further than currently may be possible before reaching an operational boundary so as to achieve lower emissions and fuel flexibility. Another benefit may be the avoidance of secondary fuel leakage into the tertiary passage which may lead to burning inside the nozzle 100 and subsequent component damage.

In summary, the first seal 320 is slid along the second tube 290 with compression decompression until it contacts the flange end 310. The seal spacer 270 is then slid along the second tube 290 until it is close to the first seal 320 and then may be screwed or otherwise secured into place on the second tube 290. The second seal 350 then may be slid along the second tube 290 until the inner diameter 210 is compressed and it is in contact with the seal spacer 270. The inner diameter 210 of the third lip seal 370 then may be compressed and the seal 370 positioned along the third tube 300 in contact with the flanged end 360. The tubes 280, 290, 300 then may be placed in the fuel nozzle 100. The seals 320, 350, 370 and the spacer 270 may be removed in the reverse order.

Figure 7:
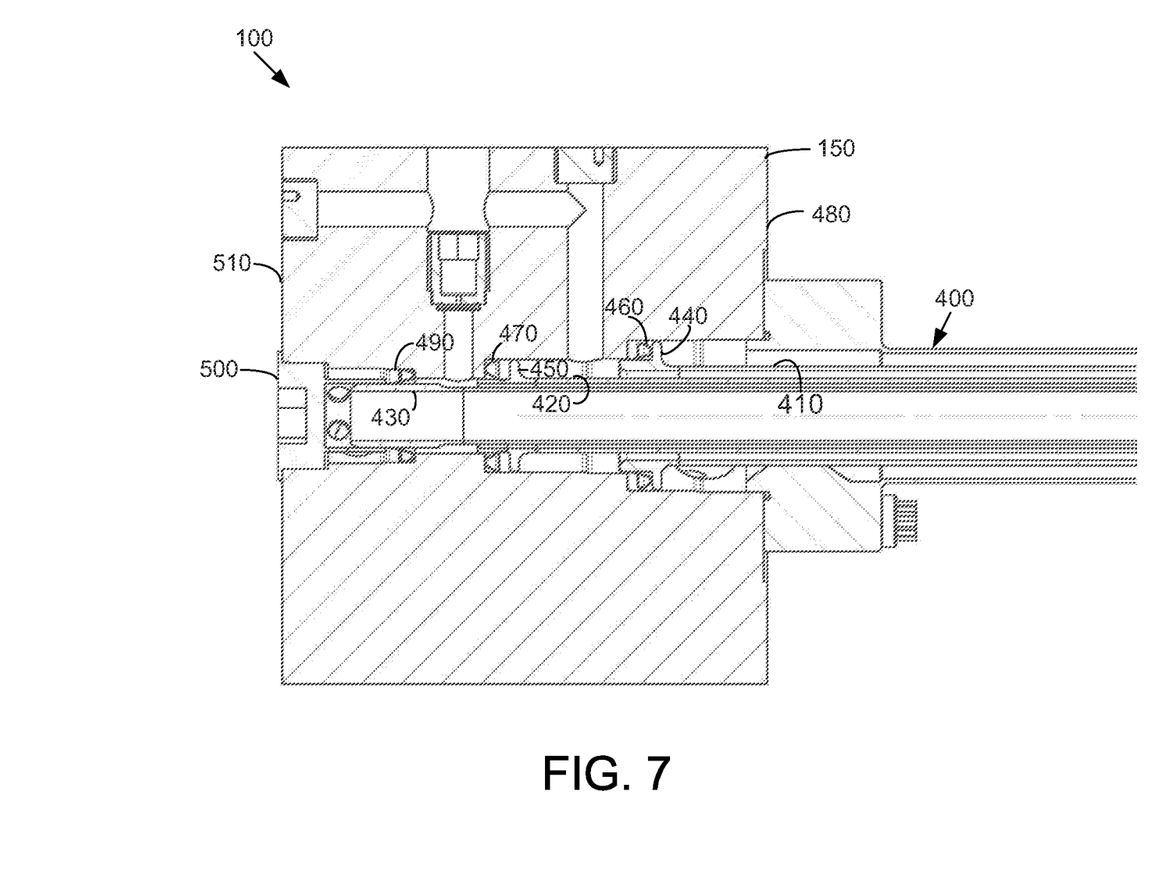
FIG. 7 is a side cross-sectional view of an alternative embodiment of a sleeve assembly as is described herein positioned within an end cap.

FIG. 7 shows an alternative embodiment of a sleeve assembly 400 that may be used with the end cap 150 of the fuel nozzle 100. In this example, three secondary passages of progressively smaller diameter are shown, a first tube 410, a second tube 420, and a third tube 430. The tubes 410, 420, 430 may have any desired decreasing diameter. Any number of tubes 410, 420, 430 may be used herein. The first tube 410 may end in a first tube flange 440. Likewise, the second tube 420 may end in a second tube flange 450. A first lip seal 460 may be positioned about the first tube flange 440 while a second lip seal 470 may be positioned about the second tube flange 450. The first and second lip seals 460, 470 may be positioned within a first side 480 of the end cap 150.

A third lip seal 490 may be positioned about the third tube 430. The third tube 430 may not have a flange thereon. Rather, the third lip seal 490 may be held in position via a seal collar 500. The seal collar 500 may extend from a second side 510 of the end cap 150 and extend along the third tube 430.

In use, the first lip seal 460 may be positioned about the first tube flange 440 of the first tube 410 while the second lip seal 470 may be positioned about the second tube flange 450 of the second tube 420. The sleeve assembly 400 then may be positioned within the first side 480 of the end cap 150. The lip seals 460, 470 may be held in place against the tube flanges 440, 450 and the end block 150 itself.

Once the sleeve assembly 400 is positioned within the first side 480 of the end cap 150, the third lip seal 490 may be positioned about the third tube 430 via the second slide 510 of the end cap 150. The seal collar 500 then may be positioned within the second side 510 of the end cap 150 up against the third seal 490. Other configurations may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A method of mounting lip seals within a sleeve assembly of a fuel nozzle, comprising:
   providing a first tube and a second tube arranged in a concentric manner, wherein an outer diameter of the first tube is greater than an outer diameter of the second tube;
   sliding a first lip seal along the second tube until the first lip seal contacts a first tube flange of the first tube;
   sliding a seal spacer along the second tube until the seal spacer contacts the first lip seal, wherein an outer diameter of the seal spacer is less than an outer diameter of the first lip seal; and
   sliding a second lip seal along the second tube until the second lip seal contacts the seal spacer, wherein the seal spacer is positioned between the first lip seal and the second lip seal, and wherein an outer diameter of the second lip seal is equal to the outer diameter of the first lip seal.

2. The method of claim 1, wherein the step of sliding the first lip seal along the second tube until the first lip seal contacts the first tube flange of the first tube comprises compressing an inner diameter of the first lip seal.

3. The method of claim 1, wherein the step of sliding the second lip seal along the second tube until the second lip seal contacts the seal spacer comprises compressing an inner diameter of the second lip seal.

4. The method of claim 1, further comprising sliding a third lip seal along a third tube, wherein the third tube is arranged in a concentric manner with the first tube and the second tube, wherein an outer diameter of the third tube is less than the outer diameter of the second tube, and wherein an outer diameter of the third lip seal is less than the outer diameter of the second lip seal.

5. The method of claim 4, wherein the third tube comprises a third tube flange and the step of sliding the third lip seal along the third tube comprises sliding the third lip seal into contact with the third tube flange.

6. The method of claim 4, wherein the step of sliding the third lip seal along the third tube comprises compressing an inner diameter of the third lip seal.

7. The method of claim 1, wherein the seal spacer comprises a tubular shape.

8. The method of claim 1, further comprising the step of setting the seal spacer in place along the second tube.

9. The method of claim 1, wherein the seal spacer comprises a plurality of flow apertures defined therein, and wherein the method further comprises the step of flowing fluid through the flow apertures and into the first tube.

10. The method of claim 1, further comprising inserting the first lip seal, the second lip seal, and the seal spacer into a first diameter bore of a fuel nozzle end cap.

11. The method of claim 4, further comprising inserting the first lip seal, the second lip seal, and the seal spacer into a first diameter bore of a fuel nozzle end cap, and inserting the third lip seal into a second diameter bore of the fuel nozzle end cap.

12. A sleeve assembly for a fuel nozzle, comprising:
   a first tube;
   a second tube, wherein the first tube and the second tube are arranged in a concentric manner, and wherein an outer diameter of the first tube is greater than an outer diameter of the second tube;
   a first lip seal positioned on the second tube and in contact with the first tube;
   a seal spacer positioned on the second tube and in contact with the first lip seal, wherein an outer diameter of the seal spacer is less than an outer diameter of the first lip seal; and
   a second lip seal positioned on the second tube and in contact with the seal spacer, wherein the seal spacer is positioned between the first lip seal and the second lip seal, and wherein an outer diameter of the second lip seal is equal to the outer diameter of the first lip seal.

13. The sleeve assembly of claim 12, further comprising a third tube arranged in a concentric manner with the first tube and the second tube, wherein an outer diameter of the third tube is less than the outer diameter of the second tube.

14. The sleeve assembly of claim 13, further comprising a third lip seal positioned on the third tube adjacent to a third tube flange of the third tube.

15. The sleeve assembly of claim 12, wherein the seal spacer comprises one or more set screws configured for setting the seal spacer in place along the second tube.

16. The sleeve assembly of claim 12, wherein the seal spacer comprises a plurality of flow apertures defined therein and configured to allow fluid to flow through the flow apertures and into the first tube.

17. The sleeve assembly of claim 12, wherein the first lip seal is positioned adjacent a first tube flange of the first tube.

18. A method of mounting lip seals within a sleeve assembly of a fuel nozzle, comprising:
   providing a first tube and a second tube arranged in a concentric manner, wherein an outer diameter of the first tube is greater than an outer diameter of the second tube;

sliding a first lip seal along the second tube until the first lip seal directly contacts a first tube flange of the first tube;

sliding a seal spacer along the second tube until the seal spacer directly contacts the first lip seal, wherein an outer diameter of the seal spacer is less than an outer diameter of the first lip seal; and sliding a second lip seal along the second tube until the second lip seal directly contacts the seal spacer, wherein the seal spacer is positioned between the first lip seal and the second lip seal, and wherein an outer diameter of the second lip seal is equal to the outer diameter of the first lip seal.

19. A sleeve assembly for a fuel nozzle, comprising:

a first tube;

a second tube, wherein the first tube and the second tube are arranged in a concentric manner, and wherein an outer diameter of the first tube is greater than an outer diameter of the second tube;

a first lip seal positioned on the second tube and in direct contact with the first tube;

a seal spacer positioned on the second tube and in direct contact with the first lip seal, wherein an outer diameter of the seal spacer is less than an outer diameter of the first lip seal; and a second lip seal positioned on the second tube and in direct contact with the seal spacer, wherein the seal spacer is positioned between the first lip seal and the second lip seal, and wherein an outer diameter of the second lip seal is equal to the outer diameter of the first lip seal.

* * * * *